(Model.)

J. HALLETT.
DETACHABLE STEP FOR FARM WAGONS.

No. 272,543. Patented Feb. 20, 1883.

Witnesses:
Wm B Drescher
Wm H Drescher

Inventor:
James Hallett.

UNITED STATES PATENT OFFICE.

JAMES HALLETT, OF HANNIBAL, MISSOURI, ASSIGNOR OF ONE-HALF TO DANIEL W. MORGAN, OF PITTSFIELD, ILLINOIS.

DETACHABLE STEP FOR FARM-WAGONS.

SPECIFICATION forming part of Letters Patent No. 272,543, dated February 20, 1883.

Application filed October 23, 1880. Renewed July 17, 1882. (Model.)

*To all whom it may concern:*

Be it known that I, JAMES HALLETT, a citizen of the United States, residing at Hannibal, in the county of Marion and State of Missouri, have invented a new and useful improvement in wagon-steps to facilitate the getting into and out of lumber or farm wagons, of which the following is a specification.

My invention relates to improvements on the fixed wagon-step so as to adapt it to farm or lumber wagons; and the object of my invention is by making the step detachable to apply it to large wagons, where the fixed step, for obvious reasons, cannot be employed. I attain this object by the device illustrated in the accompanying drawings, in which—

Figure 2:
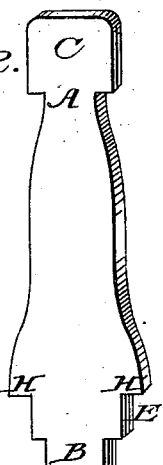
Figure 1:
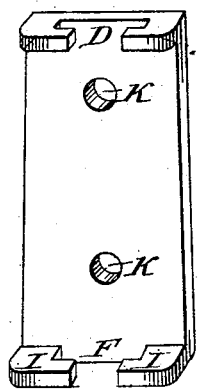
Figure 3:
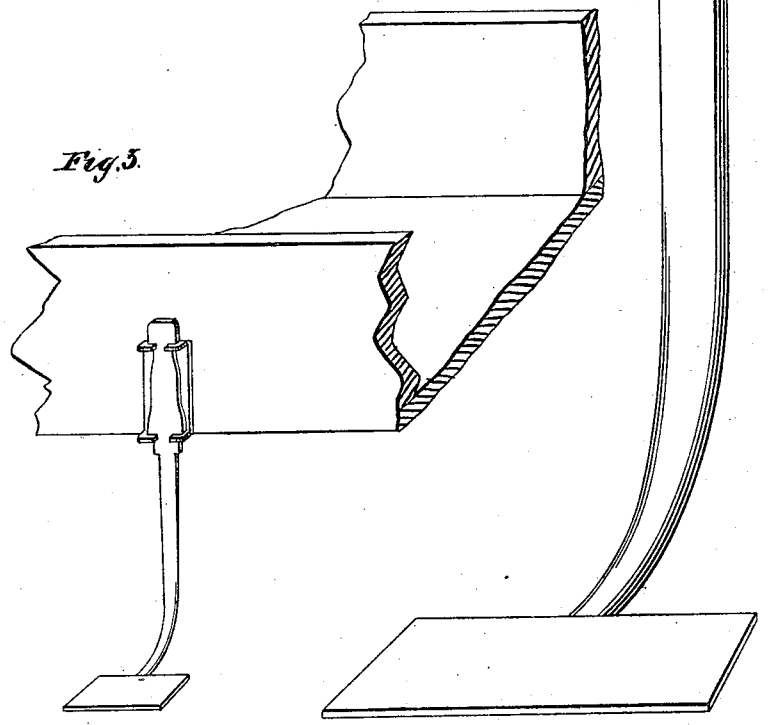

Figure 1 is a plate of malleable iron to be secured permanently to the wagon-box by rivets or bolts; and Fig. 2, the step proper, with its shaft fitted to slots and bearings shown in Fig. 1. Fig. 3 is a perspective view, showing the step applied to a wagon-box.

Similar letters refer to similar parts in the drawings.

The plate shown in Fig. 1 is to be fastened one on each side of the wagon-box, and is so shaped as to receive and support the shaft and step shown in Fig. 2.

In attaching the step to the wagon, the parts of the shaft A and B are pressed into openings D and F of the attaching-plate. The step is then pressed down, so that the shoulders H rest upon lugs I, the head C filling the enlarged or notched part of recess D, and part E the enlarged part of recess F.

Detaching the step from the wagon is effected by raising the shaft and passing it out through openings D and F, when it may be taken into the wagon or hung up in the wagon-house.

I am not aware that prior to my invention a detachable step has been employed on lumber-wagons, or, indeed, on vehicles of any kind, nor, hence, that any step has been produced at all suited to wagons whose beds are sometimes to be removed or that are to be driven among stumps, &c.

A large proportion of people, especially in the great West, ride exclusively in these large wagons, and are subjected to the inconvenience and actual danger of climbing over muddy wheels. All this is obviated by my simple device, which is inexpensive and safe, can be instantly attached to or detached from the wagon, is always clean and ready for use, and furnishes, with the projecting cleat uniformly found at the bottom of the wagon-bed, a convenient and easy mode of ascent and descent from the wagon.

What I therefore claim as my invention, and desire to secure by Letters Patent, is—

The herein-described detachable and adjustable wagon-step, consisting of shank and step formed in one piece, the shank having shoulders H, and the supporting or attaching plate having notched recesses D and F, all combined, arranged, and operating substantially as shown, for the purpose set forth.

JAMES HALLETT.

Witnesses:
WILLIAM A. COWAN,
EDWARD M. CAMPBELL.